(12) United States Patent
Baseotto et al.

(10) Patent No.: US 7,581,279 B2
(45) Date of Patent: Sep. 1, 2009

(54) DEVICE CONNECTING A WIPER ARM TO A WIPER BLADE, A WIPER BLADE AND A WIPER ARM

(75) Inventors: Michel Baseotto, Hasselt (DE); Christian Wilms, Beringen (DE); Hubert Verelst, Tienen (DE); Frans Breesch, Borgloon (DE); Tom Vangeel, Herk de Stad (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/399,509

(22) PCT Filed: Oct. 26, 2001

(86) PCT No.: PCT/DE01/04021

§ 371 (c)(1),
(2), (4) Date: Apr. 17, 2003

(87) PCT Pub. No.: WO02/34594

PCT Pub. Date: May 2, 2002

(65) Prior Publication Data

US 2004/0025281 A1    Feb. 12, 2004

(30) Foreign Application Priority Data

Oct. 28, 2000   (DE) ................................ 100 53 602

(51) Int. Cl.
*B60S 1/40* (2006.01)
*B60S 1/34* (2006.01)

(52) U.S. Cl. ............................. 15/250.32; 15/250.351; 15/250.43

(58) Field of Classification Search ............... 15/250.32, 15/250.44, 250.43, 250.361, 250.351
See application file for complete search history.

(56) References Cited

U.S. PATENT DOCUMENTS

| 2,946,078 | A | * | 7/1960 | Deibel et al. ............. 15/250.32 |
| 2,965,915 | A | * | 12/1960 | Krohm .................... 15/250.32 |
| 3,874,020 | A | * | 4/1975 | Van Eekelen et al. .... 15/250.44 |
| 3,899,800 | A | * | 8/1975 | Wittwer et al. ........... 15/250.44 |
| 4,400,845 | A | * | 8/1983 | Noguchi et al. ........ 15/250.201 |
| 6,192,546 | B1 | | 2/2001 | Kotlarski |

FOREIGN PATENT DOCUMENTS

| DE | 199 52 054 | 5/2001 |
| EP | 0 895 907 | 2/1999 |
| EP | 1 332 077 | 8/2003 |
| FR | 2 759 048 | 8/1998 |
| WO | WO 01/89891 A1 | 11/2001 |

* cited by examiner

*Primary Examiner*—Gary K Graham
(74) *Attorney, Agent, or Firm*—Michael Best & Friedrich

(57) ABSTRACT

The invention relates to a device to connect a wiper arm (10) to a wiper blade (12) featuring a supporting element (16) on which a connecting element (14) for the wiper arm (10) is attached, which features at least two holding means (30, 32) for the counter holding means (34, 36) connected to the wiper arm (10). It is proposed that a base part (38) be attached between the connecting element (14) and the supporting element (16), which is firmly connected to the supporting element (16) and connected with the connecting element (14) so that it can rotate.

11 Claims, 4 Drawing Sheets

DEVICE CONNECTING A WIPER ARM TO A WIPER BLADE, A WIPER BLADE AND A WIPER ARM

STATE OF THE ART

Figure 1:
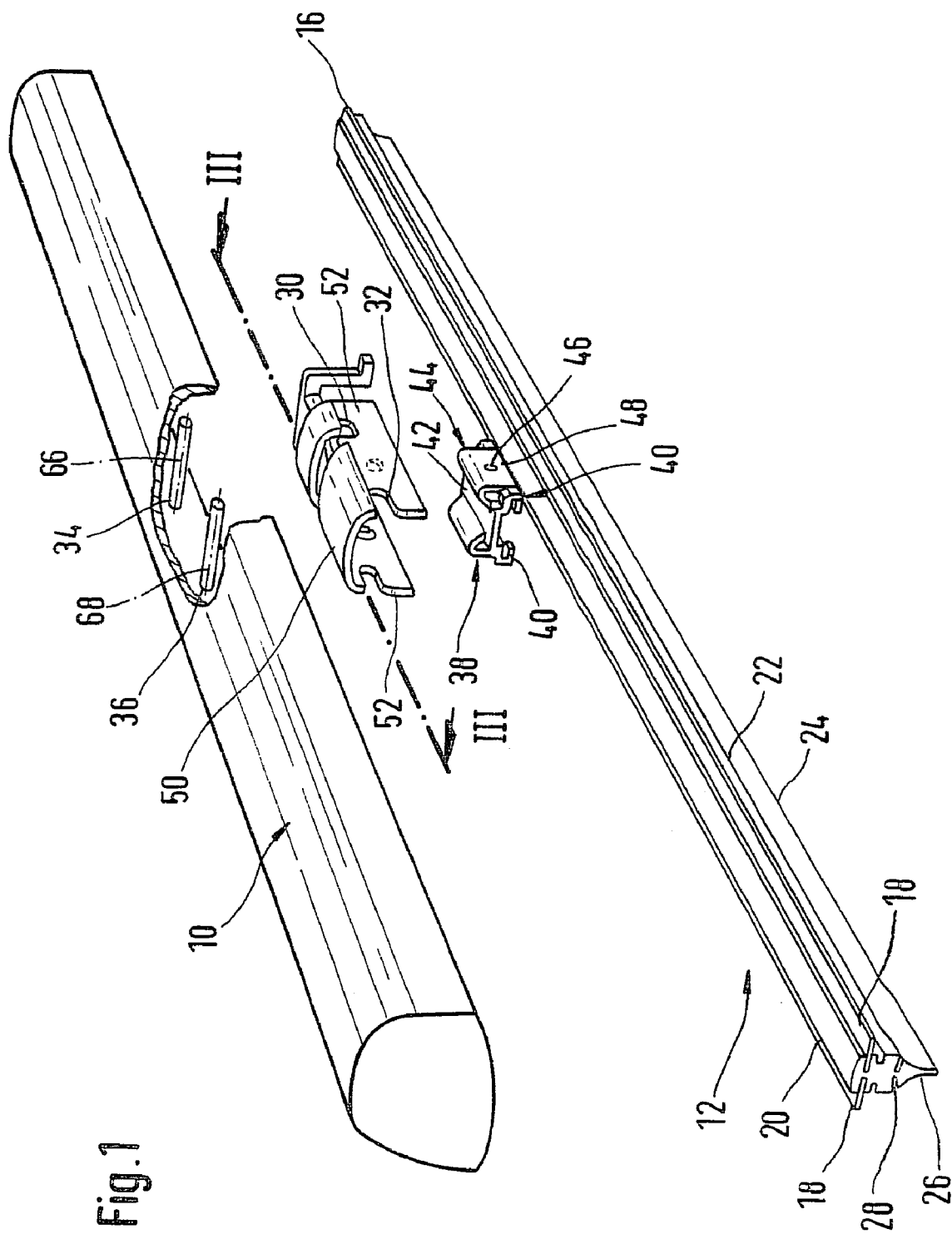
Figure 1A:
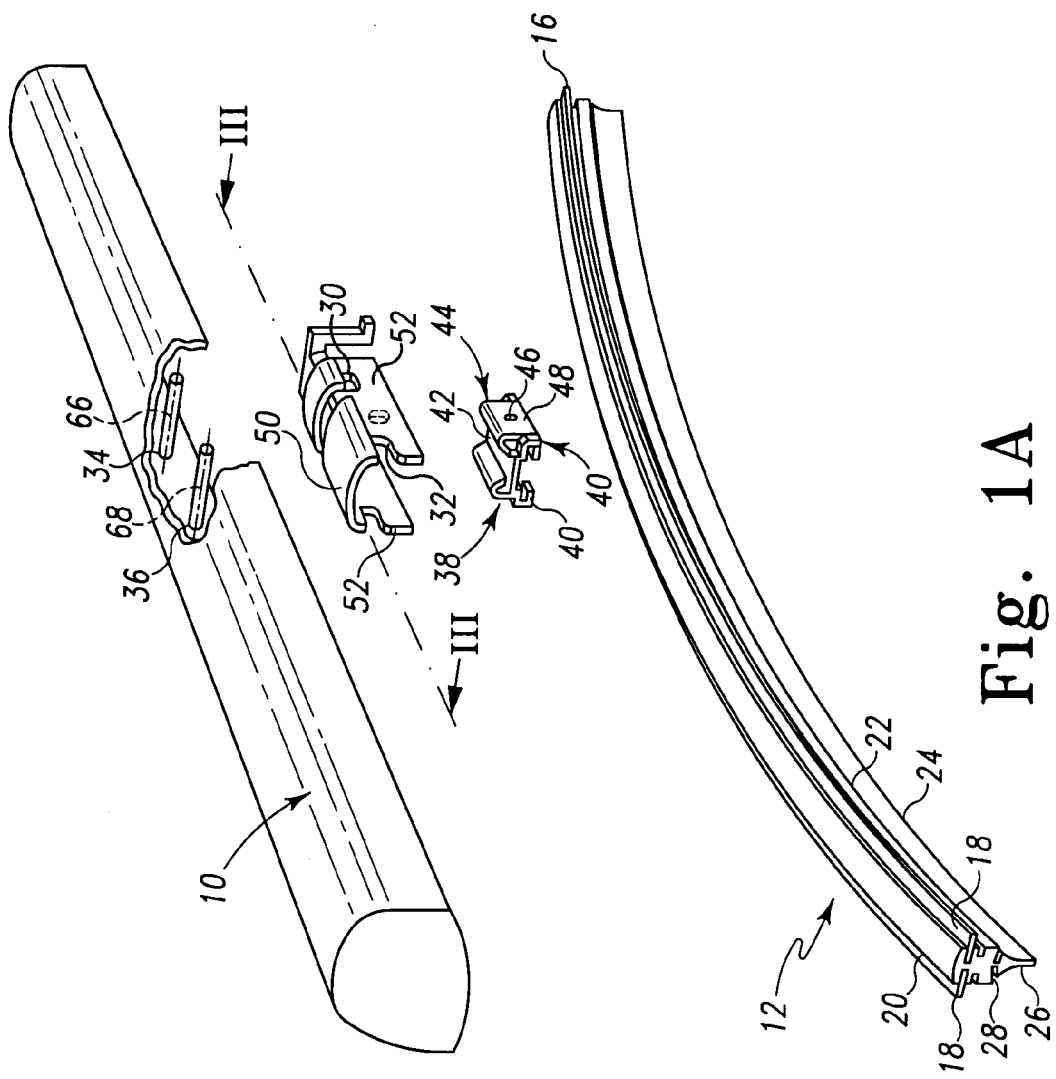

The invention relates to a device to connect a wiper arm to a wiper blade as well as wiper blade containing one part of the device on the wiper-blade side and a wiper arm containing one part of the device on the wiper-arm side. With this type of known device (DE 199 52 054) the wiper blade features a supporting element on which a connecting element for a wiper arm is attached. The connecting element is a plastic part, which rests on the supporting element with a first side and has guide ways that lead from the side opposite from the supporting element into the body of the connecting element. A first guide way leads from the upper side of the connecting element into the body in order to reach an axis receptacle from there in a curve. There is a narrowing between the curve and the axis receptacle so that an axis fastened to the wiper arm that is introduced into the guide channel locks into the axis receptacle via a resistance of the narrow location. The second guide channel leads out of the upper side into a curve whose mid-point in the axis receptacle lies in the plastic part. As a result, after the first axis of the wiper arm is inserted and catches, the second axis is also inserted by rotating the wiper arm or the wiper blade relative to the wiper arm.

With this system, the axis receptacle operates in connection with the axis of the wiper arm as an articulated connection between the wiper arm and the wiper blade so that during wiper operation the wiper blade can twist relative to the wiper arm and thereby the axis relative to the axis receptacle. This strains the plastic body and particularly the narrow location in the guide channel via which the wiper blade is locked onto the wiper arm.

ADVANTAGES OF THE INVENTION

The device, in accordance with some embodiments of the invention, has the advantage that the functions—holding the wiper arm and providing a swivel joint between the wiper arm and wiper blade—are separated. Despite this, the wiper arm and wiper blade can be safely connected to one another by a simple insertion and locking. The base part is already permanently applied during wiper blade manufacturing and assumes an additional holding function there between the supporting element and a wiper strip of the wiper blade. The connecting element can be connected with the supporting part so that it can rotate and the wiper blade that has been prepared in this manner can be firmly connected with the wiper arm.

Advantageous further developments of the device according to some embodiments of theinvention relate to the connecting piece's U-shaped design, whereby the base part can be accommodated so that it saves space, and whereby the connecting piece's U-legs can simultaneously be used as guide surfaces first for the base part and secondly for the wiper arm.

Advantageous further developments of the device according to the main claim are possible due to the features listed in the sub-claims. Thus, due to the connecting piece's U-shaped design, the base part can be accommodated so that it saves space, whereby the connecting piece's U-legs can simultaneously be used as guide surfaces first for the base part and secondly for the wiper arm.

If at least one or both holding means are embodied as one or more guideways extending through the U-base into the U-legs, defined holding positions are produced, which can be achieved by the simple (because guided) fitting of one into the other. If the guide ways are embodied differently, it prevents the wiper blade from being mounted incorrectly, relative to the wiper arm.

In an advantageous further development, first articulation means are attached to the U-legs which cooperate with the second articulation means attached to base part. In this way, first the overlapping part of the connecting element and the base part are utilized in a space saving manner for the formation of the articulation and, secondly, the rotation around the articulation means is guided with a low amount of play due to the flat design of the U-legs that are adjacent to the base part. Fabricating the connecting element of the plastic prevents the metal parts of the wiper blade from coming into direct contact with the metal parts of the wiper arm so that clattering noise or corrosion from metal rubbing against metal is already avoided at the outset.

There is a simple assembly possibility if at least one of the holding means features a locking device in which at least one counter holding means can be engaged so that it locks. These holding means are designed to be particularly secure if the locking device is designed so that it can be locked independently but unlocked again only manually. This makes it possible to quickly mount the wiper blade on the wiper arm, whereby inadvertent disassembly and therefore possible critical situations during operation of the wiper device are avoided.

The locking device is particularly simple to operate if it is connected with a lever arm overlapping the supporting element. The lever arm can then be guided until it is under the wiper arm and operated from there. Another development provides for the locking device to feature a lever arm corresponding to an opening in the wiper arm. The lever is then operated in a particularly simple way via the opening on the wiper arm.

DRAWINGS

Figure 2:
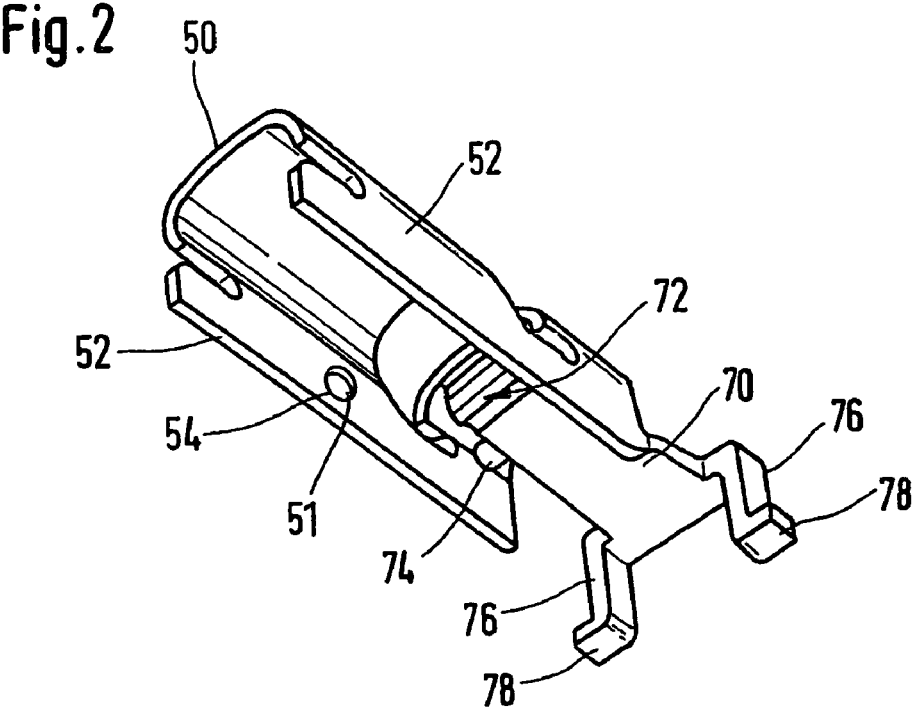
Figure 3:
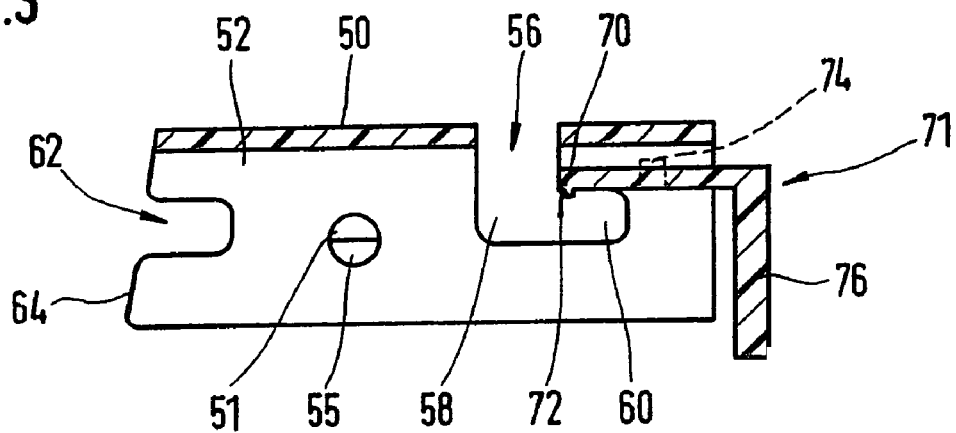
Figure 4:
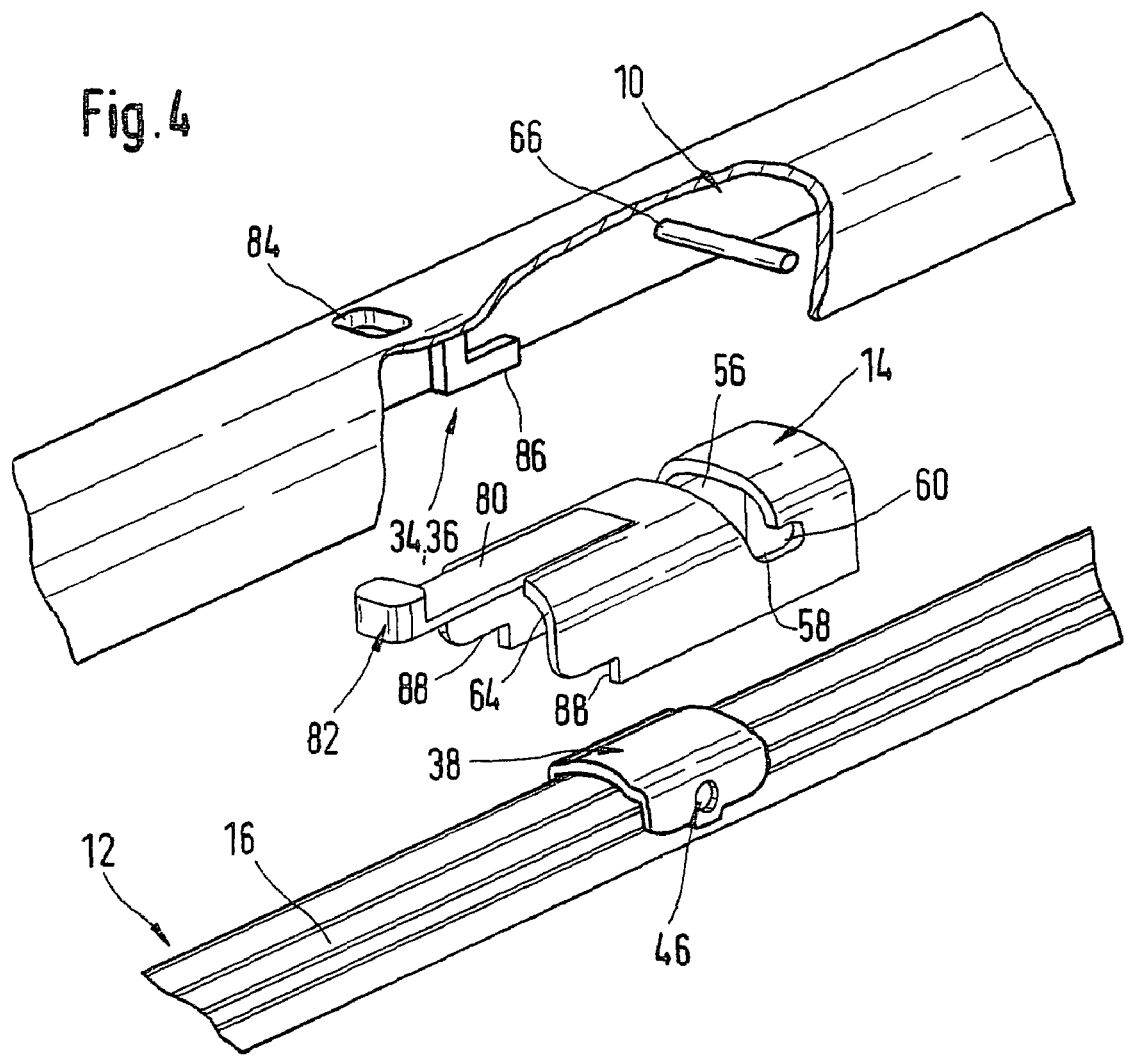
Figure 5:
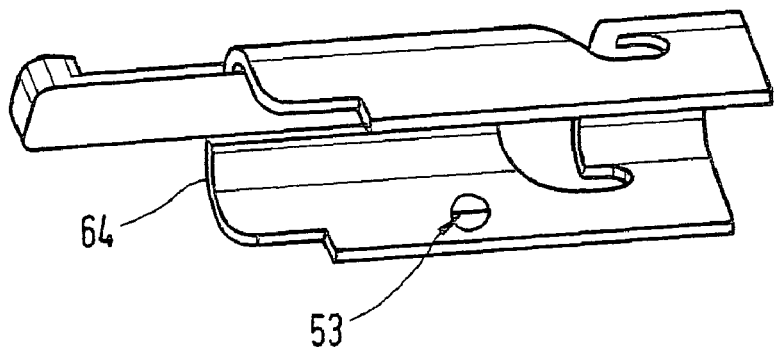

Two exemplary embodiments of the device in accordance with the invention are depicted in the drawings and explained in more detail in the following description. The drawings show:

FIG. 1 A device in accordance with the invention according to the first exemplary embodiment in an exploded view, FIG. 2 The connecting element of the first exemplary embodiment in accordance with FIG. 1 in a diagonal view from below, FIG. 3 A section that is not true to scale through the connecting element of the first exemplary embodiment along line III-III, FIG. 4 A device according to the second exemplary embodiment in an exploded view and, FIG. 5 A connecting element of the device according to the second exemplary embodiment in a diagonal view from below.

DESCRIPTION

FIG. 1 depicts a device in accordance with the invention according to the first exemplary embodiment with wiper arm 10, and wiper arm 12 as well as connecting element 14. Wiper blade 12 features supporting element 16, which is inserted in the form of two separate strips, 18, into the longitudinal grooves of head strip 20 of wiper strip 22. Wiper wedge 26 featuring wiper lip 24 is adjacent to head strip 20 and is connected to head strip 20 via rocker bridge 28.

Though wiper blade 12 is depicted in an extended form, it features a curvature in a relaxed state such that wiper strip 22 runs in the concave area and head strip 20 in the convex area of the curvature. The curvature itself is stronger than the strongest window curvature so that when wiper arm 10 presses on wiper blade 12, wiper lip 24 is adjacent over its entire length to the window, with essentially uniform distribution of pressure.

Connecting element 14, attached between wiper blade 12 and wiper arm 10, features holding means 30 and 32 that cooperate with the wiper arm 10's counter holding means, 34 and 36.

Attached between connecting element 14 and supporting element 16 is base part 38, which is firmly connected with supporting element 16 and connected to connecting element 14 so that it can rotate. To this end, base part 38 features claws 40, which firmly surround supporting element 16 or its strips, 18, with a form fit. The strips 18 are thereby fixed in their respective longitudinal grooves in head strip 20. An improvement of this bond is achieved if base part 38 is welded or soldered to supporting element 16. This measure can also be used in addition to the claws 40 or independent thereof.

Extending between the claws 40, of which preferably four are present, is base body 42, and the two side walls, 44, are bent away from this in a curved form. The side walls 44 run along the longitudinal sides of the strips 18 and thereby offer an additional hold. In a center area, each side wall 44 features an opening, 46, both of which serve as articulation means 48.

Connecting element 14 is of a U-shaped design with a U-base, 50, and two U-legs, 52, extending out from U-base 50. In the assembly position, connecting element 14's U-base 50 and U-legs 52 overlap with base part 38. In this way, the insides of U-legs 52 are adjacent to or more or less play to the outside side walls 44 of base part 38.

Articulation means 54 are attached to the insides of U-legs 52, which have the shape of the two pins 51, projecting inwards, whose edges pointing away from the U-base are beveled. In the assembly position, the pins 51 serve as the first articulation means, 54, which cooperate with the openings 46 as second articulation means, 48.

There is a guide way, 56 (FIG. 3), in connecting element 14, which extends from U-base 50 into U-leg 52 and from there leads into curve 58 and end receptacle 60. Another guide way, 62, is also provided, which extends from front side 64 into the respective U-leg, 52. In the assembly position with wiper arm 10, these guideways, 56 and 62, serve as holding means 30 and 32, which cooperate with axes 64 and 66 that are aligned parallel to one another and fastened in the wiper arm, which for their part functions as counter holding means 34 and 36.

When assembling the device in accordance with the invention, if base part 38 is already firmly fastened on supporting element 16, connecting element 14 is slipped over base part 38, whereby U-legs 52 deflect laterally somewhat as soon as bevels 55 of the pins 51 make contact with side walls 44 of the base part. With additional pressing, the pins 51 lock into the openings 46 in such a way that a rotatable fastening is created between connecting element 14 and base part 38. Then, wiper blade 12, prepared in this manner, is guided onto wiper arm 10 so that axis 68 is guided along front side 64 up to guide way 62 and axis 66 is guided through guide way 56 up to curve 58. Wiper blade 12 is then moved along the longitudinal extension of the wiper blade or wiper arm 10 so that axis 64 moves in the direction of end receptacle 60 and comes to rest there.

End receptacle 60 is overlapped by notch lever 70 whose notch nose, 72, represents a narrowing of guide way 56. Notch lever 70 is fastened on springy swivel joint 74 on the inside of U-legs 52. This swivel joint, 74, for example, can be a plastic connection between notch lever 70 and U-leg 52, or a type of film hinge between notch lever 70 and U-base 50. On the side of notch lever 70, opposite from notch nose 72, with respect to swivel joint 74, notch lever 70 spreads into the two arms, 76, leading outwards that terminate in two collars 78.

When assembling the device, if axis 66 is guided in the direction of end receptacle 60, notch nose 72 is deflected and swings back as soon as axis 66 has reached its end position in end receptacle 60. The wiper arm is thus firmly locked into connecting element 14. For the disassembly process, collars 78 that project laterally below wiper arm 10 must be pressed down so that notch nose 72 releases end receptacle 60 and the axis can be guided out along curve 58 and guide way 56. The locking device can therefore be locked independently and unlocked manually. This means that the locking device locks independently during assembly, but must be unlocked by hand for disassembly. For this purpose, the locking device features at least one, but in the case at hand, the two lever arms 76 overlapping supporting element 16, which can be actuated from the outside.

In the second exemplary embodiment (FIGS. 4 and 5) the same parts are provided with the same with the same reference numbers. Also in this case, base part 38 overlaps with supporting element 16, thereby guaranteeing a hold between wiper strip 22 and supporting element 16. There are openings, 46, on base part 38, which cooperate with pins 53 of connecting element 14.

In contrast to the first exemplary embodiment, connecting element 14 features only one guide way, 56, which, however, does not have a locking device on its end receptacle, 60. Notch lever 80, discharging from front side 64 and featuring collar 82 on its free end, serves as a locking device. In the assembly position, collar 82 corresponds to opening 84 in wiper arm 10. In addition, wiper arm 10 features opposing projections 86 (only one is depicted in FIG. 4) on its inner sides, which are there as counter holding means 34 and 36 with corresponding recesses 88 in front side 64 of connecting element 14.

During assembly, after connecting element 14 has been locked onto base part 38 in a known manner, wiper blade 12, that had been put together in this way, is guided onto the wiper arm from below in such a way that axis 64 can be inserted into guideway 56 and projections 86 can be passed along front side 64. If projections 86 reach recesses 88, as well as if axis 66 reaches curve 58, the wiper blade will be moved along the longitudinal extension of wiper blade 12 so that axis 66 engages in end receptacle 60 and the projections 86 engage in the recesses 88. In this case, the recesses 88 function as guide ways for the projections 86. Collar 82 then locks into opening 84 and prevents wiper blade 12 from spontaneously unlocking again. Unlocking takes place manually by applying pressure to collar 82, which is projected through opening 84.

Wiper blade 12, which has been adapted for the device in accordance with the invention, is consequently identified, in that supporting element 16 is firmly surrounded by base part 38 and that base part 38 can be connected in an articulated manner with a connecting element.

Wiper arm 10, which has been adapted for the device in accordance with the invention, is identified in that at least two holding means are embodied either in the form two axes or one or more projections within the wiper arm so that it can be engaged so that it locks with a connecting element.

The invention claimed is:

1. Device to connecting a wiper arm to a wiper blade featuring a head strip and a supporting element on which a connecting element for the wiper arm is attached, wherein the supporting element comprises a strip received within a longitudinal groove of the head strip, and wherein the connecting element includes at least two holding means that cooperate with counter holding means connected to the wiper arm to connect the wiper arm to the connecting element, one of the at least two holding means including a first aperture defined in the connecting element shaped to receive a pin of the wiper arm in mating engagement, the connecting element further including a lever releasably engagable with a second aperture defined in the wiper arm, the lever having a locked state in which the lever is engaged with the second aperture and prevents release of the at least two holding means from the counter holding means, the lever also having an unlocked state in which the lever is disengaged from the second aperture to permit release of the at least two holding means from the counter holding means, wherein the wiper blade has a curvature in a relaxed state of the wiper blade to present a concave shape directed generally away from the connecting element, and wherein a base part is attached between the connecting element and the supporting element, the base part firmly connected to the supporting element to prevent relative movement between the base part and the supporting element, and connected to the connecting element so that the base part can rotate, the base part directly connected to the supporting element.

2. Device according to claim 1, characterized in that the connecting element is U-shaped with a U-base and two U-legs and accepts the base part.

3. Device according to claim 2, characterized in that at least one holding means features a guideway extending through the U-base into the U-legs.

4. Device according to claim 2, characterized in that first articulation means are attached to the U-legs which cooperate with second articulation means attached to the base part.

5. Device according to claim 1, characterized in that the lever can be locked independently and unlocked manually.

6. A windshield wiper assembly comprising:
   a wiper arm;
   a wiper blade comprising a head strip;
   a supporting element comprising a strip received within a longitudinal groove in the head strip of the wiper blade;
   a connecting element attached to the supporting element, the connecting element including first and second apertures that each receive a respective portion of the wiper arm in mating engagement and cooperate to connect the wiper arm to the connecting element, at least one of the respective portions of the wiper arm comprising a pin, the connecting element further including a lever releasably engagable with a third aperture defined in the wiper arm, the lever having a locked state in which the lever is engaged with the third aperture and prevents release of the portions of the wiper arm from the first and second apertures, the lever also having an unlocked state in which the lever is disengaged from the third aperture to permit release of the portions of the wiper arm from the first and second apertures, the wiper blade having a curvature in a relaxed state of the wiper blade to present a concave shape directed generally away from the connecting element,
   wherein the wiper blade is connected to the wiper arm by a single base part attached between the connecting element and the supporting element, the base part firmly connected to the supporting element to prevent relative movement between the base part and the supporting element, and connected to the connecting element so that the base part can rotate, the base part directly connected to the supporting element.

7. An assembly according to claim 6, characterized in that the connecting element is U-shaped with a U-base and two U-legs and accepts the base part.

8. An assembly according to claim 7, characterized in that at least one of the first and second apertures is a guideway extending through the U-base into the U-legs.

9. An assembly according to claim 7, characterized in that first articulation means are attached to the U-legs which cooperate with second articulation means attached to the base part.

10. An assembly according to claim 6, characterized in that the locking device can be locked independently and unlocked manually.

11. A windshield wiper assembly comprising:
   a wiper arm including counter holding means;
   a wiper blade;
   a supporting element;
   a connecting element attached to the supporting element, the connecting element including a first and second holding means that cooperate with the counter holding means; and
   a base part attached between the connecting element and the supporting element, the base part firmly connected to the supporting element and connected to the connecting element so that the base part can rotate, the base part directly connected to the supporting element;
   wherein the connecting element is U-shaped with a U-base and two U-legs and accepts the base part; wherein the first holding means features a guideway extending through the U-base into the U-legs; wherein first articulation means are attached to the U-legs which cooperate with second articulation means attached to the base part; wherein which can be engaged in holding means features a locking device in which at least one counter holding means so that it locks; wherein the locking device can be locked independently and unlocked manually; wherein the locking device is connected with at least one lever arm overlapping the supporting element; and wherein the locking device features said lever arm corresponding to an opening in the wiper arm.

* * * * *